May 13, 1941.  D. SILVERMAN ET AL  2,241,623
ELECTRICAL SURVEYING
Filed Oct. 23, 1939

INVENTORS
Daniel Silverman
Paul F. Hawley
BY Clarence H. Seeley
ATTORNEY

Patented May 13, 1941

2,241,623

UNITED STATES PATENT OFFICE 2,241,623

ELECTRICAL SURVEYING

Daniel Silverman and Paul F. Hawley, Tulsa, Okla., assignors to Stanolind Oil and Gas Company, Tulsa, Okla., a corporation of Delaware Application October 23, 1939, Serial No. 300,712

6 Claims. (Cl. 175—182)

This invention relates to the art of geophysical surveying and more particularly to a method and apparatus for the electrical surveying of the earth to locate discontinuities therein.

It is well-known in the art of electrical prospecting that resistivity measurements of portions of the earth's crust can be obtained by causing current to flow between electrodes and measuring the potential drop due to this current between two or more electrodes placed in the ground between the current electrodes. However, the measurement thus obtained is indicative only of the average resistivity of the material around and below the two potential electrodes and is not suitable for indicating discontinuities in the earth, such as are occasioned by faults. The method which forms the subject of this invention is particularly applicable to discovery of such discontinuities, as will be evident upon reading the specification.

It is an object of our invention to provide a method and apparatus for electrical prospecting by which the presence and location of discontinuities in the material comprising the earth's crust can be readily determined. Another object is to provide a system of electrical prospecting which is simple and gives clear indications of the location of faults beneath the earth's surface. Further objects and advantages of our invention will be apparent from the following detailed description thereof written in conjunction with the drawing, in which.

In one of its broad aspects our invention comprises passing an electrical current through the earth between relatively distant electrodes adjacent the surface thereof and measuring the potential difference between electrodes relatively close to and on opposite sides of one of the current-carrying electrodes. Preferably the electrodes used in making the potential difference measurement are placed at substantially equal distances from the relatively close current electrode although this is not essential. The energizing current can be either direct current or alternating current of any suitable frequency, for example the frequency can range from about 20 to about 100,000 cycles per second.

Figure 1:
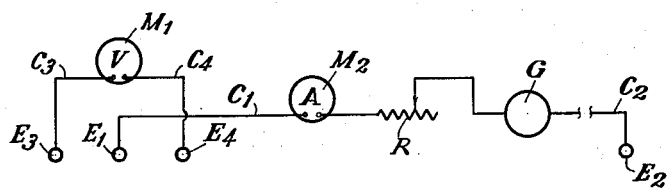
Figure 1 shows a plan view of a suitable electrode configuration in accordance with our invention together with a schematic representation of apparatus suitable for carrying out the same.

Referring now to Figure 1, two current electrodes $E_1$ and $E_2$ are located in electrical contact with the earth at a suitable distance from each other which will vary according to the scope of the survey and can suitably be in the range from about 100 to several thousand feet. Connecting electrodes $E_1$ and $E_2$ is a circuit for passing an electrical current through the earth between them consisting of conductor $C_1$, ammeter $M_2$, resistance $R$, a source of electromotive force $G$ and conductor $C_2$. As indicated above the source of electromotive force can be of either the direct or alternating current type, such as a battery or generator. Ammeter $M_2$ and resistance $R$ are not absolutely necessary to our invention and therefore may be omitted, but they are convenient in order that the amount of current passing through the earth can be easily controlled. Two potential electrodes $E_3$ and $E_4$ are located in contact with the earth on opposite sides of one of the current electrodes, in this case electrode $E_1$. Preferably the distances between electrodes $E_3$ and $E_4$ and electrode $E_1$ are substantially equal and not greater than about one-eighth of the distance between the current electrodes $E_1$ and $E_2$. Connecting electrodes $E_3$ and $E_4$ is a potential difference measuring circuit including conductors $C_3$ and $C_4$ and an instrument $M_1$ which can be an indicating or recording potentiometer or voltmeter. In this embodiment of our invention all of the electrodes are in substantial alignment, although other configurations can be used as will be brought out below.

Figure 4:
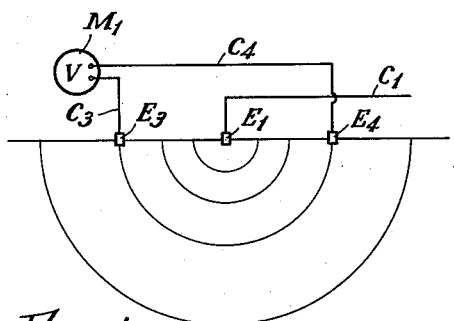
Figure 4 illustrates diagrammatically a vertical cross-section through a homogeneous portion of the earth showing the potential distribution therein adjacent one of the current electrodes.

When the earth is homogeneous the equipotential surfaces in the earth surrounding electrode $E_1$ will approximate hemispherical bowls centering at that electrode as shown in Figure 4. In this case each equipotential surface will intersect the surface of the earth at equal distances on opposite sides of electrode $E_1$, so that there will be no difference of potential between electrodes $E_3$ and $E_4$ when they are equidistant from electrode $E_1$, and voltmeter or potentiometer $M_1$ will give a zero reading. However, if there is any discontinuity in the earth's crust such as fault D having two formations $F_1$ and $F_2$ of different electrical characteristics on opposite sides thereof and if electrode $E_1$ is not positioned directly on the fault strike, the equipotential surfaces will no longer be spherical in shape but will be warped, and can, for example, have approximately the shape indicated in Figure 5 for one position of electrode $E_1$ relative to the fault. Thus there will now be a potential difference between electrodes $E_3$ and $E_4$ which will be registered or recorded by instrument $M_1$.

In carrying out an electrical prospecting operation in accordance with our invention all of the electrodes can be moved fixed distances along the surface of the ground while maintaining the spacings between them or, if electrode $E_2$ is sufficiently distant, only electrodes $E_1$, $E_3$ and $E_4$ need be so moved. For each position current from generator or battery G is passed through the earth between electrodes $E_1$ and $E_2$ and the potential difference between electrodes $E_3$ and $E_4$ is measured. These measurements are of course influenced by the presence of discontinuities in the vicinity and can be used to locate such discontinuities.

Figure 6:
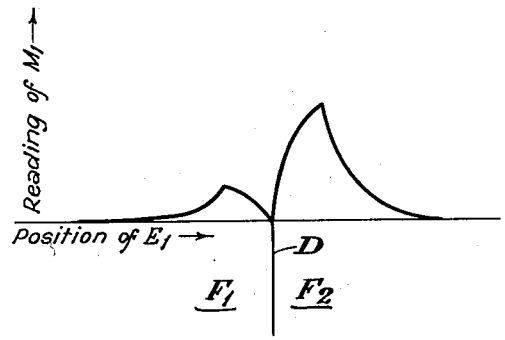
Figure 6 shows a plot of the measurements obtained using the apparatus of Figure 1 applied to the cross-section of the earth shown in Figure 5.
Figure 5:
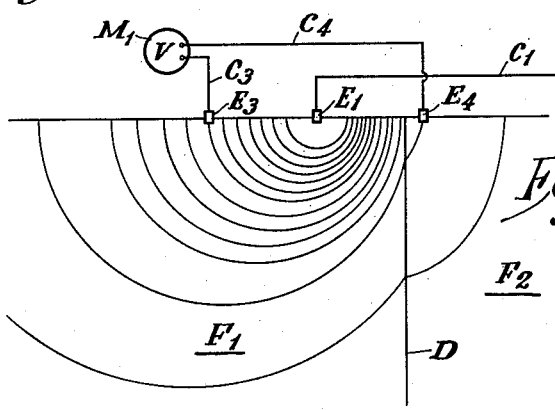
Figure 5 is similar to Figure 4 but shows the effect of a fault whose strike is normal to the line of current electrodes upon the potential distribution.

By way of illustration we will assume that the entire electrode configuration is moved along the surface of the ground in the direction $E_1$—$E_2$, and that this motion carries all four electrodes across a fault with a vertical hade, such that a material of low resistivity is present on one side of the fault plane and a material of high resistivity is present on the other side, as indicated in Figure 5. Under these circumstances a definite pattern in the measurements indicated by meter $M_1$ if plotted against the position of the current electrode $E_1$ would be obtained and such a pattern is shown in Figure 6. Obviously, this pattern is definite and unmistakable and gives an excellent indication of the presence of the fault strike. The intermediate zero reading clearly locates the fault strike while the two peaks obtained on either side of this point are separated by the distance between electrodes $E_3$ and $E_4$ and are spaced equally on each side of the zero point.

When the fault plane is not normal to the earth's surface the pattern varies from that shown but is still unmistakable to anyone performing such measurements. Likewise if the variation in electrical properties between the formations on each side of the fault plane is gradual a less distinctive pattern will be obtained, but as long as there is an inhomogeneity between the materials on opposite sides of electrode $E_1$, a definite potential difference reading will be obtained unless electrode $E_1$ is positioned directly on a fault strike or the like. In all other cases in which a zero indication is obtained the earth is homogeneous in the vicinity. This is one of the important features of our invention which distinguishes it from other less advantageous methods of determining fault strikes heretofore used.

Figure 2:
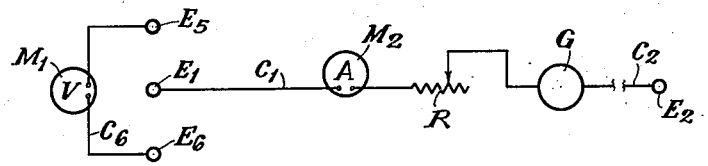
Figure 2 is similar to Figure 1 but shows a modified electrode configuration having certain additional advantages.

The electrode configuration shown in Figure 1 is, of course, not the only one which can be used to obtain the above-mentioned results in accordance with our invention. For example, the potential electrodes can be located on a line substantially perpendicular to the line between electrodes $E_1$ and $E_2$ and this configuration is illustrated in Figure 2, potential electrodes $E_5$ and $E_6$ being connected to potential-measuring instrument $M_1$ by means of conductors $C_5$ and $C_6$ respectively. This configuration is particularly advantageous since electrodes $E_5$ and $E_6$ are equally distant from electrode $E_2$ and are equally influenced thereby so that electrode $E_2$ can be somewhat closer to electrode $E_1$ than is the case with the configuration shown in Figure 1. This advantage is particularly great when using continuous alternating current and transient direct currents since inductive effects are entirely eliminated.

Figure 3:
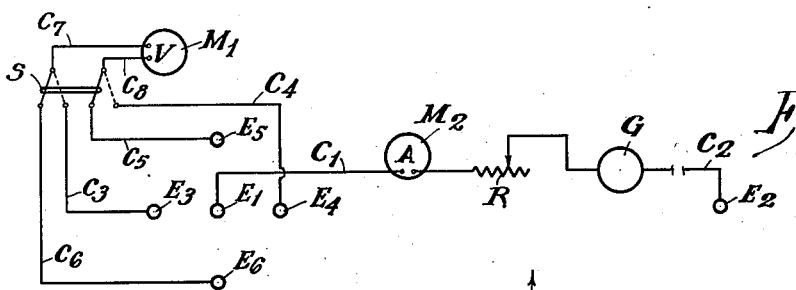
Figure 3 illustrates the use of a six-electrode configuration in accordance with our invention.

It is also possible to employ more than two potential electrodes in accordance with our invention. For example four electrodes can be placed at the corners of a square in which electrode $E_1$ is the center, and this configuration is shown in Figure 3. While separate voltmeters can be used for each pair of potential electrodes, as shown conductors $C_3$, $C_4$, $C_5$ and $C_6$ are connected through double-pole, double-throw switch S and conductors $C_7$ and $C_8$ to meter $M_1$ so that readings of the potential differences between electrodes $E_3$ and $E_4$ and between electrodes $E_5$ and $E_6$ can be measured in sequence by the same instrument. In this way an indication can be obtained of the direction of the fault strike and the time required to make a survey is thereby materially shortened.

Many other modifications of our invention can be employed and will be immediately apparent to those skilled in the art. For example, several pairs of potential electrodes in line with each other and spaced at different distances from electrode $E_1$ on opposite sides thereof can be employed, and potential difference readings taken across each pair. In this case the readings with the electrodes at increasing distances from electrode $E_1$ will be indicative of discontinuities in the ground at increasing depths.

While we have described our invention in connection with certain specific embodiments thereof, we do not desire to be limited thereto but only by the following claims in which we have defined our invention.

We claim:

1. The method of electrical surveying which comprises passing an electrical current through the earth between relatively distant electrodes adjacent the surface thereof, measuring the potential difference between points in electrical contact with the earth relatively close to and axially spaced on opposite sides of one of said electrodes, and repeating these steps for different locations of said last-mentioned electrode, whereby the presence of electrical discontinuities in the earth is determined.

2. The method of electrical surveying which comprises passing an electrical current through the earth between a current electrode adjacent the surface thereof and a distant grounded electrode, and measuring the potential difference between two grounded electrodes on opposite sides of said current electrode and equally spaced therefrom.

3. The method of claim 2 wherein said electrical current is direct current.

4. The method of claim 2 wherein said electrical current is alternating current.

5. The method of electrical surveying which comprises passing an electrical current through the earth between a current electrode adjacent the surface thereof and a distant grounded electrode, and measuring the potential differences between two grounded electrodes on opposite sides of said current electrode and substantially in line with said current electrode and said distant electrode, and between two grounded electrodes on opposite sides of said current electrode and on a line substantially perpendicular to the line connecting said current electrode and said distant electrode, said four grounded electrodes being equi-distant from said current electrode.

6. Apparatus for electrical surveying comprising a current electrode in electrical contact with the earth and adjacent the surface thereof, a distant grounded electrode, means for passing an electrical current through the earth between said electrodes, four grounded potential electrodes symmetrically placed about said current electrode, one pair of said potential electrodes being in substantial alignment with said current electrode and said distant electrode, and means for measuring the potential differences between the potential electrodes on opposite sides of said current electrode.

DANIEL SILVERMAN.
PAUL F. HAWLEY.